(12) United States Patent
Sahu et al.

(10) Patent No.: US 9,568,623 B2
(45) Date of Patent: Feb. 14, 2017

(54) NEUTRON DETECTOR WITH INTERBLENDED LIQUID SCINTILLATOR

(71) Applicant: Palo Alto Research Center Incorporated, Palo Alto, CA (US)

(72) Inventors: Saroj Kumar Sahu, Fremont, CA (US); Craig Eldershaw, Belmont, CA (US); Martin Sheridan, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 333 days.

(21) Appl. No.: 14/547,092

(22) Filed: Nov. 18, 2014

(65) Prior Publication Data

US 2016/0139280 A1    May 19, 2016

(51) Int. Cl.
*G01T 3/06*      (2006.01)
(52) U.S. Cl.
CPC ..................... *G01T 3/06* (2013.01)
(58) Field of Classification Search
CPC .................................................. G01T 3/008
See application file for complete search history.

(56) References Cited

U.S. PATENT DOCUMENTS

| | | | | |
|---|---|---|---|---|
| 4,779,000 A | * | 10/1988 | Ing | G01T 1/04 250/390.03 |
| 5,712,166 A | * | 1/1998 | Broan | G01T 1/204 250/390.03 |
| 5,905,263 A | * | 5/1999 | Nishizawa | A61N 5/1048 250/367 |
| 8,621,245 B2 | | 12/2013 | Shearer et al. | |
| 8,680,945 B1 | | 3/2014 | Wang | |
| 2002/0180639 A1 | | 12/2002 | Rickett | |

(Continued)

OTHER PUBLICATIONS

Aoyama, Takahiko et al. "Energy response of a full-energy-absorption neutron spectrometer using boron-loaded liquid scintillator BC-523", Nuclear Instruments and Methods in Physics Research A 333 (1993) 492-501, 10 pages.

Flaska, Marek et al., "Digital pulse shape analysis for the capture-gated liquid scintillator BC-523A", Nuclear Instruments and Methods in Physics Research A 599 (2009) 221-225, 5 pages.

(Continued)

*Primary Examiner* — Casey Bryant
(74) *Attorney, Agent, or Firm* — Bever, Hoffman & Harms, LLP (57) ABSTRACT

A neutron detector that utilizes cells in which a liquid scintillator is contained in elongated detector tubes, with photo-detectors disposed at each end of the tube to measure scintillation light generated by incident neutrons. The liquid scintillator is an interblended mixture including an ionic liquid blended with a scintillation enhancer and/or a moderator and/or a controlled optical attenuator. A longitudinal position of an incident neutron is determined by the magnitudes of the scintillation light portions arriving at each photo-detector, which are proportional to the distances between the neutron interaction point and the photo-detectors. The cells are arranged in a closely-spaced parallel planar array to facilitate determining incident neutron location in two dimensions. A detector system utilizes a first detector array to detect fast neutrons, a thermalizer (e.g., polyethylene) to convert fast incident neutrons to thermal neutrons, and a second detector array to detect the thermal neutrons.

13 Claims, 10 Drawing Sheets

(56) References Cited

U.S. PATENT DOCUMENTS

| | | |
|---|---|---|
| 2004/0207486 A1 | 10/2004 | York |
| 2004/0238751 A1* | 12/2004 | Penn .................. G01T 3/00 250/390.01 |
| 2008/0049228 A1 | 2/2008 | Chan |
| 2011/0303850 A1* | 12/2011 | Barillon ............... C07D 413/10 250/362 |
| 2012/0133547 A1 | 5/2012 | MacDonald et al. |
| 2012/0314541 A1 | 12/2012 | Matsuura |
| 2014/0355381 A1 | 12/2014 | Lai et al. |
| 2015/0214927 A1 | 7/2015 | Greene et al. |
| 2015/0236551 A1 | 8/2015 | Shearer et al. |
| 2015/0276489 A1 | 10/2015 | Cumming |
| 2015/0380973 A1 | 12/2015 | Scheb |
| 2016/0145214 A1* | 5/2016 | Douce .................. C07D 233/58 250/362 |

OTHER PUBLICATIONS

Vanier, Peter E., et al., "Directional detection of fission-spectrum neutrons", 1-4244-1302-8/07, 2007 IEEE, 5 pages.

Vanier, Peter E., et al., "Calibration and Testing of a Large-Area Fast-Neutron Directional Detector", Brookhaven National Laboratory, BNL-79632-2007-CP, 8 pages.

Mascarenhas, Nicholas, et al., "Directional Neutron Detectors for Use with 14 MeV Neutrons", Sandia Report, SAND2005-6255, printed Oct. 2005, 32 pages.

Mirenda, Martin, et al., "Ionic liquids as solvents for liquid scintillation technology, Cerenkov counting with 1-Butyl-3-Methylimidazolium Chloride", Radiation Physics and Chemistry 98 (2014) 98-102, 5 pages.

Swiderski, L., et al., "Further Study of Boron-10 Loaded Liquid Scintillators for Detection of Fast and Thermal Neutrons", IEEE Transactions on Nuclear Science, vol. 57, No. 1, Feb. 2010, 6 pages.

* cited by examiner

NEUTRON DETECTOR WITH INTERBLENDED LIQUID SCINTILLATOR

FIELD OF THE INVENTION

This invention relates to detection of nuclear radiation, and more particularly to detection and directional tracking of neutron sources.

BACKGROUND OF THE INVENTION

Missing nuclear materials can pose a significant environmental and health risk through direct exposure, co-mingling in the metal recycling stream, use in contaminated consumer products, and use in terrorist activities. According to International Atomic Energy Agency (IAEA) and Nuclear Regulatory Commission (NRC), hundreds of radioactive sources are abandoned, lost or stolen every year, with a large fraction of the radioactive sources never recovered. Such abandoned, lost and stolen nuclear materials can be transported to commercial and military interests and used with pernicious intentions. Therefore, detection of nuclear materials is an essential deterrent and tool for preventing the unauthorized transport and pernicious use of abandoned, lost or stolen nuclear materials will neither be diverted from controlled facilities, nor transported without authorization.

Figure 12:
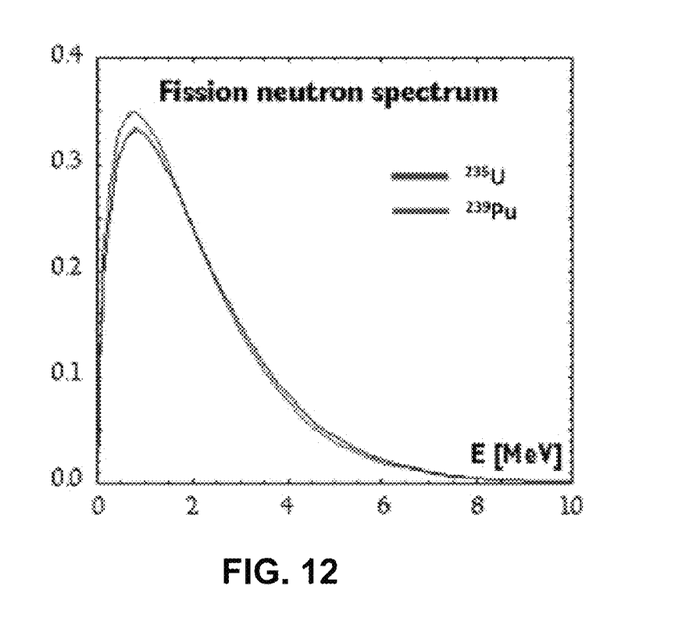
FIG. 12 is a graph showing typical neutron energies.

Every nuclear material emits one or more of four types of radiations—Alpha, Beta, Gamma and Neutron. While Alpha and Beta rays can be easily concealed with minor amount of shielding, the primary and secondary Gamma rays and Neutrons are hard to shield, and therefore are useful signatures for detection by a radiation detector. FIG. 12 shows neutron signatures from weapons and reactor grade fissile materials, namely 239Pu and 235U. As indicated, most of the neutrons emitted from weapons and reactor grade fissile materials fall in the energy range of 0.5 and 3 MeV, which make them "fast" neutrons. "Thermal" neutrons, on the other hand, have a much lower energy (<1 eV). The fast and thermal neutrons have very different mechanisms of interacting with matter, and therefore the respective detectors are made out of different technologies.

Neutron detection is the effective detection of neutrons entering a well-positioned neutron detector. For a neutron detector to work, an incident neutron must be made to interact with the detector material to create enough energy, which when converted to an appropriate electrical or optical signal, would indicate detection. There are two key aspects to effective neutron detection: hardware and software. Detection hardware refers to the kind of neutron detector used (the most common today is the scintillation detector) and to the electronics used in the detection setup. Further, the hardware setup also defines key experimental parameters, such as source-detector distance, solid angle and detector shielding, and circuitry for converting optical signals generated during neutron detection into electrical signals. Detection software consists of analysis tools that perform tasks such as graphical analysis of the neutron detection signals to measure the number and energies of neutrons striking the detector.

In the past, although simple neutron counters have been successfully developed and deployed, using proportional chambers filled with He or $BF_3$, often enclosed in moderating materials. However, such detectors are incapable of tracking the neutron by themselves (i.e., determining the incident direction traveled by the neutron to the detector, and hence the location of the neutron's source). Further, the gas including quenching agents needed in conventional neutron counters must be periodically replenished.

A large area detector capable of directional information for fast neutrons is disclosed in "Directional Neutron Detectors For Use with 14 MeV Neutrons", N. Mascharenhas et. al., Sandia Report SAND 2005-6255 (2005). This detector utilizes compact arrays of scintillator dye doped optical fibers that reconstruct the trajectory of a series of recoil protons. Although this detector exhibits a neutron track angular resolution of about 10 degrees, the neutron detection efficiency is below 1%. For a sensitive detector to be practical over a 1000 $cm^2$ scale, the neutron efficiency would have to be better than 50%.

A double proton recoil time of flight fast neutron detector using two plastic scintillator planes is described in "Calibration and Testing of a Large-Area Fast-Neutron Directional Detector", P. E. Vanier et. al., BNL-79632-2007-CP (2007), and "Directional detection of fission-spectrum neutrons", P. E. Vanier et. al., Applications and Technology Conference, LISAT 2007, IEEE Long Island. This detector has adequate area resolution, but the angular resolution is unclear, single neutron counting is not possible, and the set-up is too large to be used for mobile surveillance (i.e., too large and heavy to be transported by a tactical vehicle such as a Humvee or small truck).

What is needed is a neutron detector that is capable of accurately determining both neutron flux and the location of a neutron source, such as abandoned, lost or stolen nuclear material. What is particularly needed is a neutron detector that both accurately determines neutron flux and source location, and is compact (i.e., having a size and weight that make it capable of being mounted on a tactical vehicle for mobile surveillance).

SUMMARY OF THE INVENTION

The present invention is directed to a neutron detector that utilizes one or more detector cells to achieve both accurate neutron flux measurement and accurate neutron source location. According to a basic embodiment of the invention, each neutron cell includes an elongated detector tube containing a liquid scintillator, and a pair of photo-detectors respectively disposed at opposite ends of the detector tube. The elongated tube includes a peripheral wall (e.g., having a square or rectangular cross-section) that defines (surrounds) an elongated channel containing the liquid scintillator. According to an aspect of the invention, the liquid scintillator includes an ionic liquid blended with at least one of a scintillation enhancer, a moderator and a controlled optical attenuator such that the resulting interblended liquid scintillator cooperatively functions to both generate light pulses in response to incident neutrons, and to facilitate the transmission of light along the detector tube to the photo-detectors such that the location of each light pulse can be determined, thus providing an improvement over conventional approaches (i.e., where the absorber and scintillator have been typically physically separate materials) in that the interblended liquid scintillator provides compactness and detection efficiency.

In an exemplary embodiment, during operation of a neutron detector each detector tube is oriented horizontally and rotated or pivoted vertically to facilitate scanning a surrounding region for neutron sources. Incident neutrons generated by a neutron source pass through the peripheral wall and interact with the liquid scintillator, whereby associated light pulses are generated at associated longitudinal locations in the detector tube. Light portions from each light pulse respectively travel in opposite directions along the detector tube toward the two photo-detectors disposed on the opposing end walls. The photo-detectors are respectively optically coupled to the opposing end walls, and respectively generate detection signals including received light magnitude values indicating the amount of light arriving at the two ends of the detector tube. With this arrangement, the flux of incident neutrons can be determined by counting the number of detector signal pairs generated during a fixed time period, and the longitudinal location of each incident neutron can be determined by analyzing the two magnitude values included in each detection signal pair (e.g., using a center-of-gravity-type calculation to determine the interaction point's longitudinal location along the length of the detector tube). By facilitating the determination of the longitudinal location of each incident neutron, the neutron cells of the present invention facilitate determining the path taken by the incident neutron relative to the detector cell, which in turn facilitates locating the neutron source (e.g., the location of abandoned, lost or stolen nuclear materials from which the neutron was emitted). Further, because of their simple structure, the neutron cells of the present invention facilitate the production of compact neutron detectors having a size and weight capable of being mounted on a tactical vehicle for mobile surveillance.

According to an embodiment of the invention, the ionic liquid of the liquid scintillator includes one or more anions derived from the group including derived from the group including $[BF_4]^-$, $[PF_6]^-$, $[CF_3SO_2NSO_2CF_3]^-$, $[CF_3SO_3]^-$, and $[N(CN)_2]^-$, and one or more cations derived from the group including imidazolium, pyridinium, pyrimidinum, pyrazinium, pyrazolium, piperdinium and pyrrolidinium. In one embodiment, the ionic liquid is blended with a scintillation enhancer such as Athracene ($C_{14}H_{10}$), and may also include one or more of an organic scintillator and inorganic scintillator. In another embodiment the ionic liquid is blended with a moderator (e.g., one or more of Lithium isotope $^6Li$ and Boron isotope $^{10}B$). In yet another embodiment, the ionic liquid is blended with an organic dye (e.g., an anthraquinone-based organic dye such as Alizarin—$C_{14}H_8C_4$) that serves as a controlled optical attenuator. In yet another embodiment, liquid scintillator includes one or more room temperature ionic liquids (RTIL) blended with one or more of the above-listed materials.

According to an embodiment, the neutron detector cell further includes a pair of tapered (e.g., trapezoidal) light guides, with a first light guide disposed between the first end of the detector tube and the first photo-detector, and a second tapered light guide disposed between the second end of the detector tube and the second photo-detector. By arranging each tapered light guide such that its wide end is optically coupled to the detector tube and the photo-detector is attached to its tapered end, the photo-detectors can be made smaller, thereby reducing manufacturing costs.

According to another embodiment, the neutron detector cell is optically enclosed along its length by wrapping the detector tube with a reflector sheet and a light-sealing outer cover. The reflector sheet (e.g., a layer of reflective material such as 0.005" thick Poly Tetra Fluoro Ethylene (PTFE) film that is wrapped or otherwise disposed onto an outer surface of the detector tube material) serves to retain scintillation light generated by the scintillation liquid inside the detector tube. The light-sealing outer cover (e.g., a layer of black light-sealing material that is opaque to light, such as black electrical tape made out of rubber or heat-shrink tube made out of Poly-Vinyl Chloride (PVC) or Polyethylene (PE) that is wrapped onto an outside surface of the reflective layer). The black layer is considered important for allowing the detector tube to operate at very low levels of external optical influence. The scintillation light produced by nuclear interactions is very weak and even a minute amount of external light severely corrupts the signal-to-noise (S/N) performance of the detector. The black layer thus provides a light-shielding function.

According to another embodiment of the present invention, a neutron detector array is constructed using multiple neutron detector cells that are configured to provide both a longitudinal location and a transverse location of the interaction point of each incident neutron. The neutron detector cells are arranged in parallel (e.g., such that all of the cells are disposed in a single vertically aligned plane with their detector tubes aligned horizontally), and the array includes a detection circuit that is configured to receive detection signals from each cell, and to determine the longitudinal (e.g., X-axis or horizontal) location and transverse (e.g., Z-axis or vertical) location at which each incident neutron enters/strikes the detector array. To prevent scintillation light generated in one cell from generating a "false" detection signal in a neighboring cell of the array, each cell is optically enclosed along its length, e.g., using the arrangement described above. When an incident neutron generates a particle interaction in the detector tube of a particular detector cell (referred to as a "receiver" cell), the resulting scintillation light is carried through that detector tube to the two opposing ends, where the photons are transported (e.g., by way of trapezoidal light-guides) to the receiver cell's associated photo-detector pair, which in turn transmit corresponding detector signals to the detection circuitry. In one embodiment, photo-detector circuitry is used to amplify the detector signals for transmission to the detection circuitry to enhance signal interpretation. With this arrangement, a transverse (Z-axis/vertical) location of an incident neutron is determined by knowing the vertical location of the "receiver" cell (e.g., the vertical location of the cell in which the neutron incident occurred), and a longitudinal (X-axis/horizontal) location of the incident neutron is determined by comparing the magnitude values provided in the two detection signals transmitted from the receiver cell in the manner described above. By facilitating the determination of the transverse (cross-wise) and longitudinal location of each incident neutron, the neutron detector array of the present invention facilitates determining the path taken by the incident neutron relative to the detector cell, which in turn facilitates locating the neutron source (e.g., the location of abandoned, lost or stolen nuclear materials from which the neutron was emitted).

According to another embodiment, a neutron detection system utilizes two neutron detector arrays disposed in a spaced-apart arrangement to determine the source location of incident incident neutrons by aligning the two interaction points at which an incident neutron passes through the two arrays. With this arrangement, when an incident neutron travels in a straight line through the first array it generates a first light pulse at a first interaction point at a first time. The neutron then travels across a gap distance separating the two arrays and enters the second array, where it generates a second light pulse at a second interaction point at a second time. In one embodiment, the two neutron detector arrays include detector cells formed in the manner described above and aligned in parallel vertical planes positioned such that the gap distance corresponds to the distance traveled by a neutron in a set time period (e.g., 10 to 30 microseconds), thereby facilitating identification of neutrons by detecting related "pairs" of interactions occurring in the two arrays in the predetermined time range. By calculating the X-Z location of the first interaction point and the X-Z location of the second interaction point using the methods described above, a straight-line path between the first and second interaction points can be determined that indicates the path/direction traveled by the incident neutron to the neutron detection system, which in turn facilitates finding the neutron's source (i.e., by "back-tracking" the incident neutron's calculated straight-line path).

According to another embodiment, a neutron detection system utilizes two neutron detector arrays in a manner similar to that described above, but also includes a thermalizer layer disposed between the two arrays, and two different liquid scintillators are used that are sensitive to fast neutrons and thermal neutrons, respectively. The thermalizer layer (e.g., a polyethylene block) serves to reduce the incident neutron's energy from its initial fast level (e.g., 0.5 ev to 2.5 eV) to a thermal level (e.g., on the order of 0.03 eV). In one specific embodiment, the liquid scintillator disposed in all of the detector cells of the first array comprises an ionic liquid (e.g., $[C_4C_1Pyr]^+$ and $[BF_4]^-$), 1% anthracene (scintillation enhancer), and 0.01% Alizarin (organic dye for controlled attenuation), and the liquid scintillator disposed in all of the cells of the second array comprises ionic liquid (e.g., $[C_4C_1Pyr]^+$ and $[BF_4]^-$), 1% anthracene, 0.01% Alizarin, and a 20% mole fraction of Lithium tetrafluoroborate ($Li^+$ $BF4^-$). Using this arrangement, a suitable gap distance between the two detector arrays (e.g., in the range of 5 and 30 centimeters) facilitates identifying incident neutrons by comparing detections of fast and thermal neutrons in the first and second arrays that are separated by a measured time period in the range of 10 to 30 microseconds.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in neutron detection. The following description is presented to enable one of ordinary skill in the art to make and use the invention as provided in the context of a particular application and its requirements. As used herein, directional terms such as "horizontal" and "vertical" are intended to provide relative positions for purposes of description, and are not intended to designate an absolute frame of reference. The term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
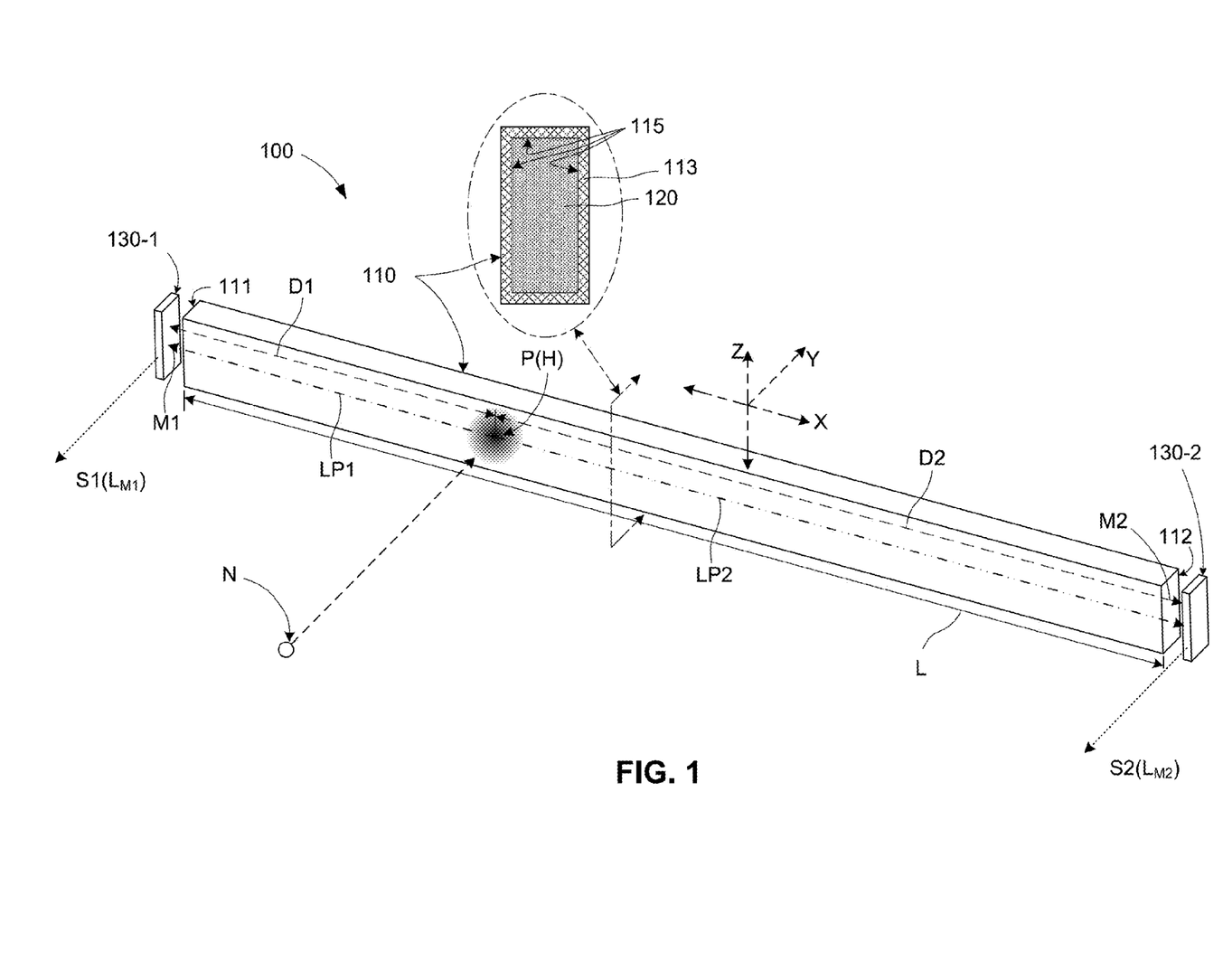
FIG. 1 is a top side perspective view showing a neutron detector cell according to a generalized embodiment of the present invention.

FIG. 1 shows a simplified detector cell 100 for a neutron detector that includes an elongated detector tube 110 containing a liquid scintillator 120, and a pair of photo-detectors 130-1 and 130-2 respectively disposed at opposite ends 111 and 112 of detector tube 110.

As indicated in cross-section in the bubble at the upper portion of FIG. 1, detector tube 110 includes a peripheral wall 113 formed using a suitable light-transmitting material (e.g., glass or clear plastic), and has a rectangular cross-section that defines (surrounds) an elongated channel 115 in which liquid scintillator 120 is operably contained. End walls 111 and 112 are formed from the same light-transmitting material as peripheral wall 113, and are respectively disposed at opposite ends of detector tube 110. Photo-detectors 130-1 and 130-2 are mounted onto end walls 111 and 112, respectively.

According to an aspect of the invention, liquid scintillator 120 is a blend of one or more ionic liquids (ILs) and at least one of a scintillation enhancer, a moderator, and a controlled optical attenuator that cooperatively function to both generate light pulses in response to incident neutrons, and to facilitate the transmission of light along the detector tube to photo-detectors 130-1 and 130-2 such that the location of each light pulse can be determined. By producing liquid scintillator 120 as an interblended liquid scintillator in this manner, neutron detector cell 100 thus provides an improvement over conventional approaches (i.e., where the absorber and scintillator have been typically physically separate materials) in that the blend provides compactness and detection efficiency that is not provided in the previous efforts.

In an exemplary embodiment, liquid scintillator 120 comprises one or more ionic liquids that include one or more anions (i.e., negative ions) derived from the group including $[BF_4]^-$, $[PF_6]^-$, $[CF_3SO_2NSO_2CF_3]^-$, $[CF_3SO_3]^-$, and $[N(CN)_2]^-$, and one or more cations (i.e., positive ions) derived from the group including imidazolium, pyridinium, pyrimidinum, pyrazinium, pyrazolium, piperdinium and pyrrolidinium. In a practical embodiment, the ionic liquid is a Room Temperature Ionic Liquid (RTIL), which is a salt in a liquid state in which the ions are poorly coordinated, which results in the RTIL being liquid at temperatures much below 100° C., even at room temperature. The benefit of using RTILs is that heating of detector cell 100 during operation may be omitted.

According to various exemplary specific embodiments set forth in detail below, liquid scintillator 120 includes one or more RTILs (i.e., room temperature ionic liquids composed of one or more anions and one or more cations derived as described above) blended with at least one scintillation enhancer (e.g., Athracene), a moderator (e.g., Boron and/or Lithium), or a controlled optical attenuator (e.g., an organic dye such as Alizarin).

In a first exemplary specific embodiment, liquid scintillator 120 includes the one or more RTILs blended with Athracene (scintillation enhancer) in an amount of 0.01% to 10% by weight. The use of Athracene in combination with one or more RTILs was found to provide a liquid scintillator having superior scintillation efficiency for mobile neutron detection arrangements. In alternative embodiments, organic or inorganic scintillators are blended with the RTILs in addition to or in place of Athracene to enhance the scintillation efficiency.

In a second exemplary specific embodiment, liquid scintillator 120 includes the one or more the RTILs blended with one or more moderators (i.e., compounds that act as neutron interaction centers, or "moderators" as known in the nuclear industry). Suitable moderators include one or more of Lithium and Boron, and more specifically a combination of Lithium isotopes $^{6}Li$ and Boron isotopes $^{10}B$, which serve to increase the ability of liquid scintillator 120 to capture (i.e., react with) incident neutrons N due to their large neutron reaction cross-sections. In one specific embodiment, liquid scintillator 120 includes naturally occurring Boron and Lithium, which comprises Lithium isotope $^{6}Li$ and Boron isotope $^{10}B$ in amounts of 7% and 20%, respectively. In a presently preferred embodiment, liquid scintillator 120 includes one or more of pure $^{6}Li$ and pure $^{10}B$, so that the detection efficiency may be even higher than the case where naturally occurring Boron and Lithium are used.

In a third exemplary specific embodiment, liquid scintillator 120 includes the one or more RTILs blended with one or more moderators (e.g., Lithium and Boron) and one or more controlled optical attenuators that are added to enable measuring the lengthwise position of interaction along the length of each tube (i.e., the point at which the neutron generates scintillation), resulting in excellent areal resolution, and therefore excellent angle measurement and tracking. Suitable controlled optical attenuators include organic dyes, and more preferably anthraquinone-based organic dyes such as Alizarin (i.e., 1,2-dihydroxyanthraquinone, also known as Mordant Red-11 and Turkey Red, an organic compound with the formula $C_{14}H_{8}C_{4}$). Referring to FIG. 1, the controlled optical attenuator causes scintillation light (light pulse) emitted from a point of interaction P in liquid scintillator 120 (i.e., the point at which an incident neutron N interacts with the scintillation liquid such that photons are generated) to reach photo-detectors 130-1 and 130-2 with magnitudes M1 and M2 that are respectively inversely proportional to distances D1 and D2 between photo-detectors 130-1 and 130-2 and interaction point P. That is, because the sum of distances D1 and D2 is fixed, due to the presence of the controlled optical attenuator, the farther the light travels from the interaction point P to one of the photo-detectors (e.g., light LP1 traveling to photo-detector 130-1), the smaller the magnitude of light received by that photo-detector (i.e., magnitude M1 of light LP1), and the larger the magnitude of light received by the second photo-detector (i.e., magnitude M2 of light LP2 received by photo-detector M2). The addition of controlled optical attenuators is currently considered optional in that, in some cases, inter-blended liquid scintillators including only ionic liquids and one or more scintillation enhancers and/or moderators exhibit sufficient light attenuation, whereby the addition of a separate attenuator substance may be omitted.

In a fourth exemplary specific embodiment, liquid scintillator 120 includes one or more RTILs blended with one or more of pure Lithium isotope $^{6}Li$ and Boron isotope $^{10}B$, one or more organic dyes (controlled optical attenuators), and Athracene (scintillation enhancer). This blend of RTILs, moderators, controlled optical attenuators and Athracene provides detector tube 110 with superior performance in mobile neutron detection settings, which facilitates efficient and rapid location of a neutron source using the methodology set forth below.

The above listed specific embodiments are intended to be exemplary and not limiting. For example, liquid scintillator 120 may include compositions similar to those set forth above, but using ionic liquids other than those of the RTIL variety.

Referring again to FIG. 1, during operation detector tube 110 is oriented horizontally (e.g., in the indicated X-Y plane) and rotated or pivoted vertically (e.g., around the Z-axis) to facilitate scanning a surrounding region for neutron sources. Incident neutron N passes through peripheral wall 113 and enters liquid scintillator 120, whereby associated light pulse P is generated at associated longitudinal location H (i.e., the horizontal position of light pulse P relative to the entire length L of detector tube 110). Light portions LP1 and LP2 emitted from light pulse P respectively travel in opposite directions along detector tube 110 toward photo-detectors 130-1 and 130-2, which are respectively disposed on opposing end walls 111 and 112. Photo-detectors 130-1 and 130-2 are respectively optically coupled to opposing end walls 111 and 112 of detector tube 110, and respectively generate detection signals S1 and S2 that include received light magnitude values $L_{M1}$ and $L_{M2}$, respectively, which indicate the amount of light arriving at end walls 111 and 112 from each light pulse P. With this arrangement, the flux of incident neutrons N can be determined by counting the number of detector signal pairs (i.e., detection signal S1 and a simultaneous detection signal S2) generated during a fixed time period, which corresponds to the number of incident neutron interactions and resulting light pulses P generated inside detector tube 110. Further, the longitudinal location H of each incident neutron N can be determined by analyzing the two magnitude values $L_{M1}$ and $L_{M2}$ included in each detection signal pair (e.g., using a center-of-gravity-type calculation to determine the distances D1 and D2, and from those determined distances the longitudinal location of interaction point P). By facilitating the determination of longitudinal location H of each incident neutron, neutron cell 100 facilitates determining the path taken by each incident neutron N relative to detector cell 100, which in turn facilitates locating the neutron's source (e.g., the location of abandoned, lost or stolen nuclear materials from which the neutron was emitted). Further, as set forth in additional detail below, because of its simple structure, neutron cell 100 facilitates the production of compact neutron detectors having a size and weight capable of being mounted on a tactical vehicle for mobile surveillance.

Additional features and alternative neutron detector cell structures will now be described.

Figures 2A, 2B:
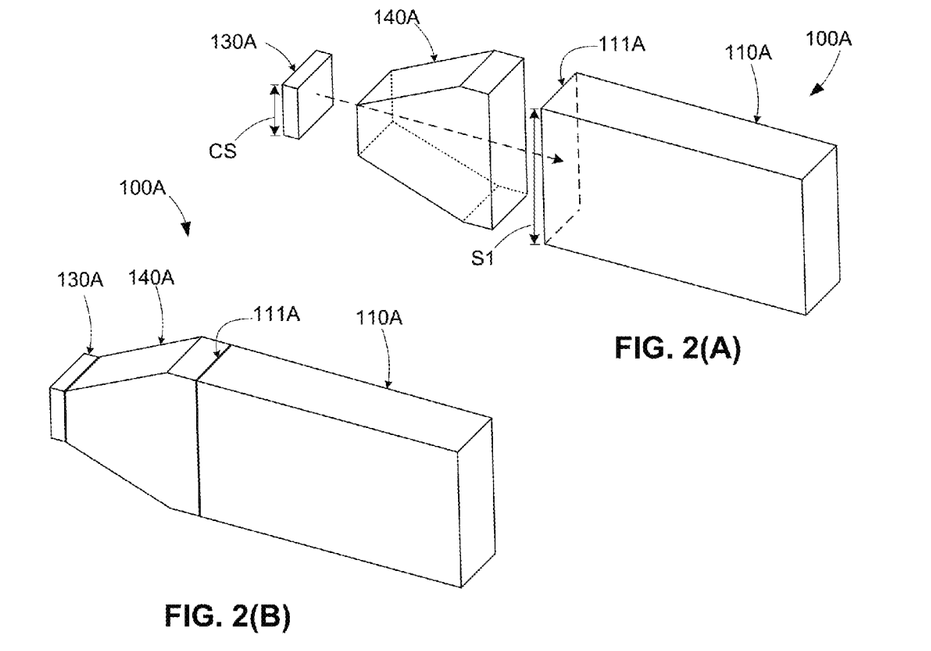
FIGS. 2(A) and 2(B) are exploded partial perspective and assembled partial perspective views showing a neutron detector cell according to an alternative embodiment of the present invention.

FIG. 2(A) is an exploded partial perspective view showing a portion of a neutron detector cell 100A according to an embodiment in which a pair of tapered (e.g., trapezoidal) light guides 140A (one shown) are respectively disposed between each end wall (e.g., wall 111A) of detector tube 110A and an associated photo-detector (e.g., photo-detector 130A). The second light guide (not shown) is disposed between the second end of detector tube 110A and the second photo-detector. FIG. 2(B) shows the same portion of neutron detector cell 100A after light guide 140A is assembled such that its wide end is optically coupled to detector tube 110A by way of wall 111A, and photo-detector 130A is attached to a tapered end of light guide 140A. By utilizing tapered light guide 140A in this manner, a chip size CS of photo-detector 130A can be made smaller than if it were required to fit over the entirety of end wall 111A, whereby overall manufacturing costs are reduced.

Figure 3:
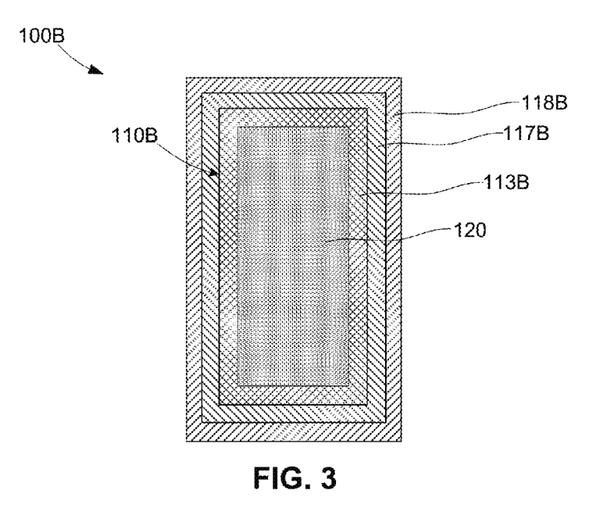
FIG. 3 is a cross-sectional side view showing a neutron detector cell according to another alternative embodiment of the present invention.

FIG. 3 is a cross-sectional side view showing another neutron detector cell 100B according to another embodiment in which detector tube 110B is optically enclosed along its length by way of a reflector layer 117B and a light-sealing outer cover 118B.

Reflective layer 117B includes a reflective material disposed on an outside surface of the peripheral wall 113B of detector tube 110B. In one specific embodiment, reflector layer 117B includes a layer of reflective material such as 0.005" thick Poly Tetra Fluoro Ethylene (PTFE) film that is loosely wrapped or otherwise disposed onto an outer surface of peripheral wall 113B. In other embodiments, reflector layer 117B is implemented by aluminum, Chromium, gold or silver that is coated or otherwise disposed on an outside surface of the peripheral wall 113B. Reflector layer 117B serves to prevent loss scintillation light generated by neutron interactions with scintillation liquid 120 such that the light is retained inside detector tube 110B. While gold or other metal coatings provide light guidance through reflection, loosely wrapped reflective films (e.g., PTFE) guide a major part of light using total internal reflection, so loosely wrapped reflective films may be more effective in some cases.

Light-sealing layer 118B includes an opaque material that is disposed (e.g., coated or wrapped) on an outside surface of reflective layer 117B. In alternative exemplary embodiments, light-sealing layer 118B is provided by way of black rubber electrical tape that is wrapped around detector tube 110B, or by way of a heat-shrink tube made out of Poly-Vinyl Chloride (PVC) or Polyethylene (PE) that is shrink-wrapped onto an outside surface of the reflective layer 117B. Light-sealing layer 118B is considered important because detector cell 100B must be operated at very low levels of external optical influence.

According to various additional alternative embodiments of the present invention, multiple neutron detector cells (described above) are combined to form neutron detector arrays and systems in a manner such as that forth below.

Figure 4:
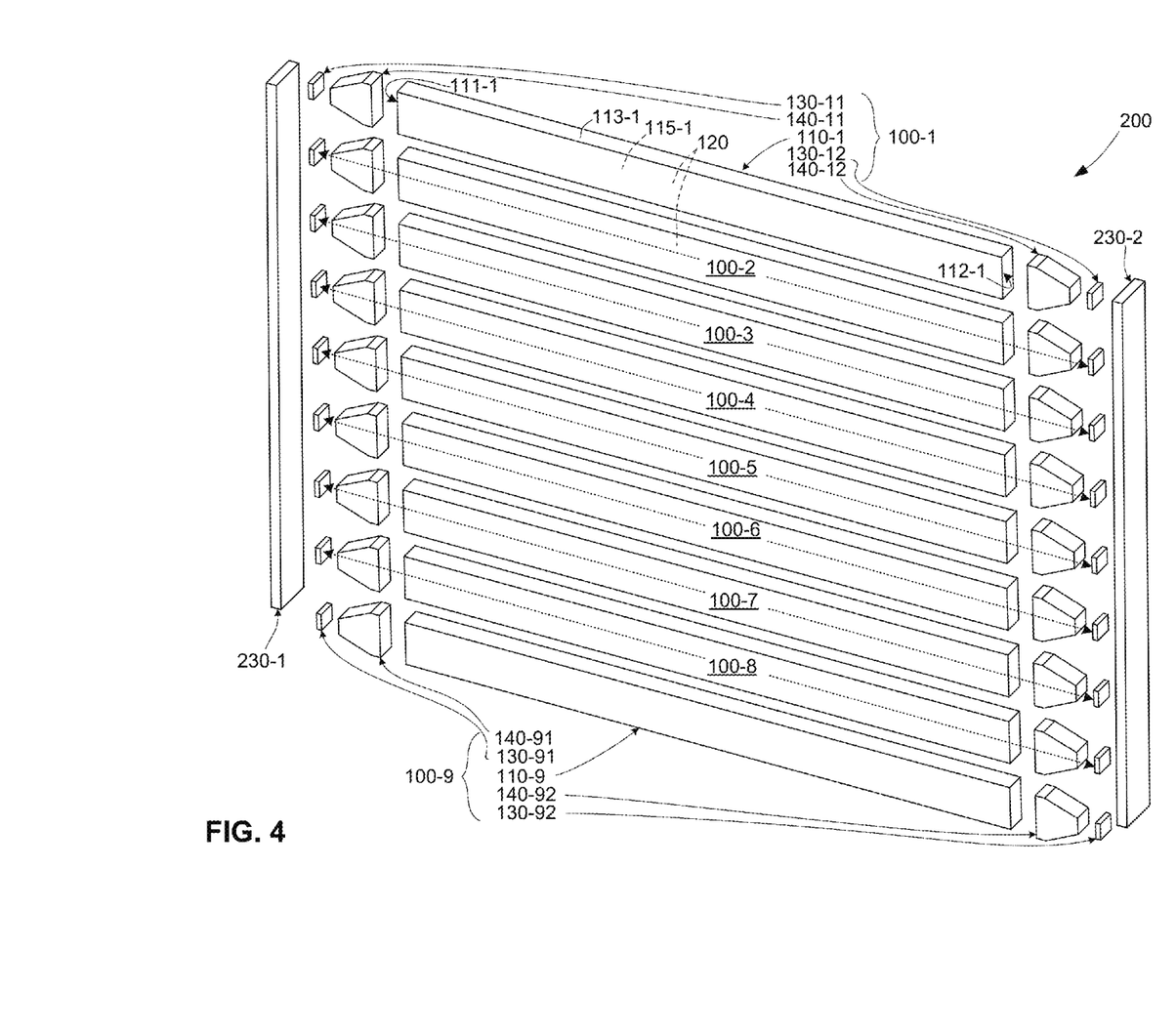
FIG. 4 is an exploded perspective view top side perspective view showing a neutron detector array including multiple detector cells according to another embodiment of the present invention.
Figure 5:
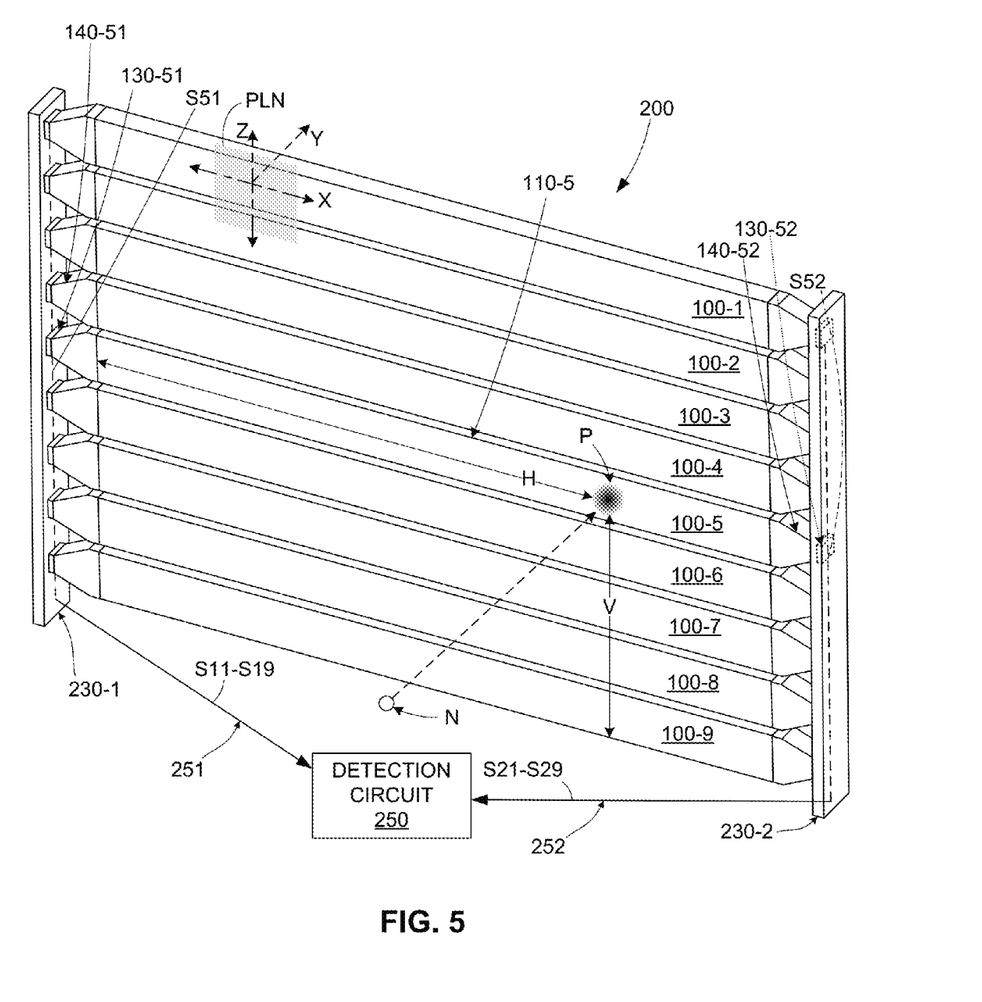
FIG. 5 is a top side perspective view showing the neutron detector array of FIG. 4 in an assembled state.

FIG. 4 shows a neutron detector array 200 including multiple detector cells 100-1 to 100-9 in a partially exploded state, and FIG. 5 shows neutron detector array 200 in an assembled state. Referring to FIG. 4, each detector cell 100-1 to 100-9 is constructed and arranged in a manner similar to that described above with reference to FIGS. 1 to 3. For example, referring to the upper portion of FIG. 4, detector cell 100-1 includes an elongated detector tube 110-1 having opposing end walls 111-1 and 112-1 and a peripheral wall 113-1 that collectively define an enclosed channel 115-1, a pair of tapered light guides 140-11 and 140-12 respectively mounted onto opposing end walls 111-1 and 112-1, and a pair of photo-detectors 130-11 and 130-12 respectively optically coupled to end walls 111-1 and 112-1 by way of tapered light guides 140-11 and 140-12. Similarly, as indicated at the lower end of FIG. 4, detector cell 100-9 includes a pair of photo-detectors 130-91 and 130-92 respectively optically coupled to an elongated detector tube 110-9 by way of associated tapered light guides 140-91 and 140-92. Liquid scintillator 120, which is described above, is disposed in the detector tube of each detector cell 110-1 to 110-9. In the manner described above, each photo-detector of detector cells 110-1 to 110-9 is configured to generate an associated detection signal including an associated light magnitude value indicating an amount of detected light generated within its associated detector tube in the manner described above. To facilitate providing power to detector cells 110-1 to 110-9, and to facilitate the transmission of detection signals from each of the photo-detectors to a processor (e.g., detection circuit 250, shown in FIG. 5), the photo-detectors are mounted onto elongated pathway boards 230-1 and 230-2.

Referring to FIG. 5, when neutron detector array 200 is assembled and oriented for operation, detector cells 100-1 to 100-9 are arranged horizontally (e.g., as shown in FIG. 5, parallel to the X-axis) and aligned in a vertically oriented plane (e.g., in X-Z plane PLN, as shown in FIG. 5), and the photo-detectors of detector cells 110-1 to 110-9 are coupled to detection circuit 250 by way of elongated pathway boards 230-1 and 230-2 and busses 251 and 252. Detection circuit 250 is configured to receive separate detection signals S11 to S19 from photo-detectors located at a first end of each detector tube by way of pathway board 230-1 and bus 251, and to receive separate detection signals S21 to S29 from photo-detectors located at the opposite end of each detector tube by way of pathway board 230-2 and bus 252.

According to the exemplary embodiment, detection circuit 250 is configured to determine the longitudinal (e.g., X-axis or horizontal) location and transverse (e.g., Z-axis or vertical) location at which each incident neutron enters/strikes detector array 200. For example, FIG. 5 shows an incident neutron N striking detector array 200, thereby generating a particle interaction P inside one of the detector tubes of cells 100-1 to 100-9 at a longitudinal location H and transverse location V. In this example, particle interaction P is generated in detector tube 110-5 of detector cell 100-5, which is referred to as the "receiver cell" in this case), and the resulting scintillation light is carried through detector tube 110-5 to the two opposing ends, where the photons are transported (e.g., by way of trapezoidal light-guides 140-51 and 140-52) to photo-detectors 130-51 and 130-52), which in turn transmit corresponding detector signals S51 and S52, respectively, to detection circuitry 250. Detector array 200 is configured to determine transverse (vertical) location V of incident neutron N by identifying the receiver cell by way of identifying the corresponding set of detection signals transmitted from the receiver cell, and to determine the longitudinal horizontal location H of incident neutron by comparing the light magnitude values transmitted in the corresponding associated detection signals. In the example shown in FIG. 5, the receiver cell (i.e., detector cell 100-5) is determined by way of detector signal S51, which is generated by photo-detector 130-51 and is transmitted to detection circuit 250 via pathway board 230-1 and bus 251, and by way of simultaneously generated detector signal S52, which is generated by photo-detector 130-52 and is transmitted to detection circuit 250 via pathway board 230-2 and bus 252. That is, because no other neutrons enter detector array 200 at the same time light pulse P is generated by incident neutron N, detection circuit 250 identifies detector cell 100-5 as the receiver cell by way of signals S51 and S52, which are the only set of detector signals generated/received at that time, and calculates transverse location V by way of stored vertical position data assigned to detector cell 100-5. To determine longitudinal location H of incident neutron N, the magnitude values provided in detection signals S51 and S52 are compared in the manner described above. By facilitating the determination of the transverse (cross-wise) and longitudinal location of each incident neutron, neutron detector array 200 of the present invention facilitates determining the path taken by the incident neutron relative to the detector cell, which in turn facilitates locating the neutron source (e.g., the location of abandoned, lost or stolen nuclear materials from which the neutron was emitted).

Figure 6:
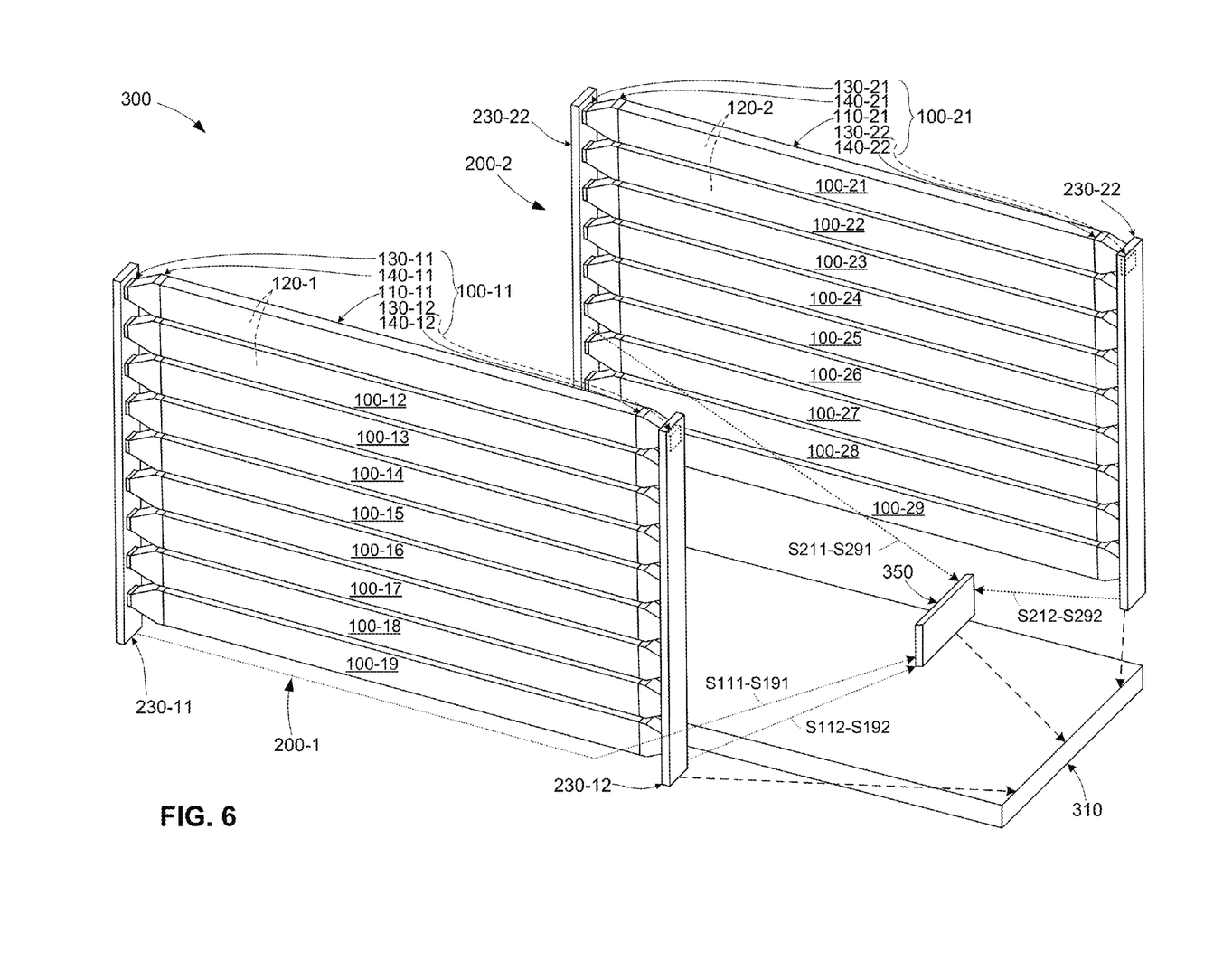
FIG. 6 is an exploded perspective view showing a neutron detection system according to another embodiment of the present invention.

FIG. 6 is an exploded perspective view showing a neutron detection system 300 that utilizes two detector arrays 200-1 and 200-2 and detection circuitry 350 to determine the location of a neutron source. Detector arrays 200-1 and 200-2 are mounted onto opposite edges of base structure 310 in a spaced-apart manner, and detection circuitry 350 is mounted such that it is coupled to receive detection signals 5111 to 5191 and 5112 to 5192 from detector array 200-1, and to receive detection signals S211 to S291 and S212 to S292 from detector array 200-2 200-2 in a manner similar to that described above.

Referring to FIG. 6, detector array 200-1 includes nine detector cells 100-11 to 100-19 that contain a (first) liquid scintillator 120-1 and are connected together by way of elongated pathway boards 230-11 and 230-12, and detector array 200-2 includes nine detector cells 100-21 to 100-29 that contain a (second) liquid scintillator 120-2 and are connected together by way of elongated pathway boards 230-21 and 230-22. Detector cells 100-11 to 100-19 and 100-21 to 100-29 are configured and operate in the manner described above with reference to one of detector cells 100, 100A and 100B (FIGS. 1 to 5), and each detector array 200-1 and 200-2 is configured and operate in the manner described above with reference to detector array 200 (FIGS. 4 and 5). For example, detector cell 100-11 includes an elongated detector tube 110-11 containing liquid scintillator 120-1, and photo-detectors 130-11 and 130-12 respectively optically coupled to opposing ends of detector tube 110-11 by way of tapered light guides 140-11 and 140-12, where photo-detectors 130-11 and 130-12 are configured to detect light portions generated by liquid scintillator 120-1 in response to an interaction with a neutron, and to generate associated detection signals (e.g., signals 5111 and 5112) including associated light magnitude values. Similarly, detector cell 100-21 includes an elongated detector tube 110-21 containing second liquid scintillator 120-2, and photo-detectors 130-21 and 130-22 respectively optically coupled to opposing ends of detector tube 110-21 by way of tapered light guides 140-21 and 140-22, where photo-detectors 130-21 and 130-22 are configured to detect light portions generated by liquid scintillator 120-1 in response to an interaction with a neutron, and to generate associated detection signals (e.g., signals S211 and S212) including associated light magnitude values.

Figure 7:
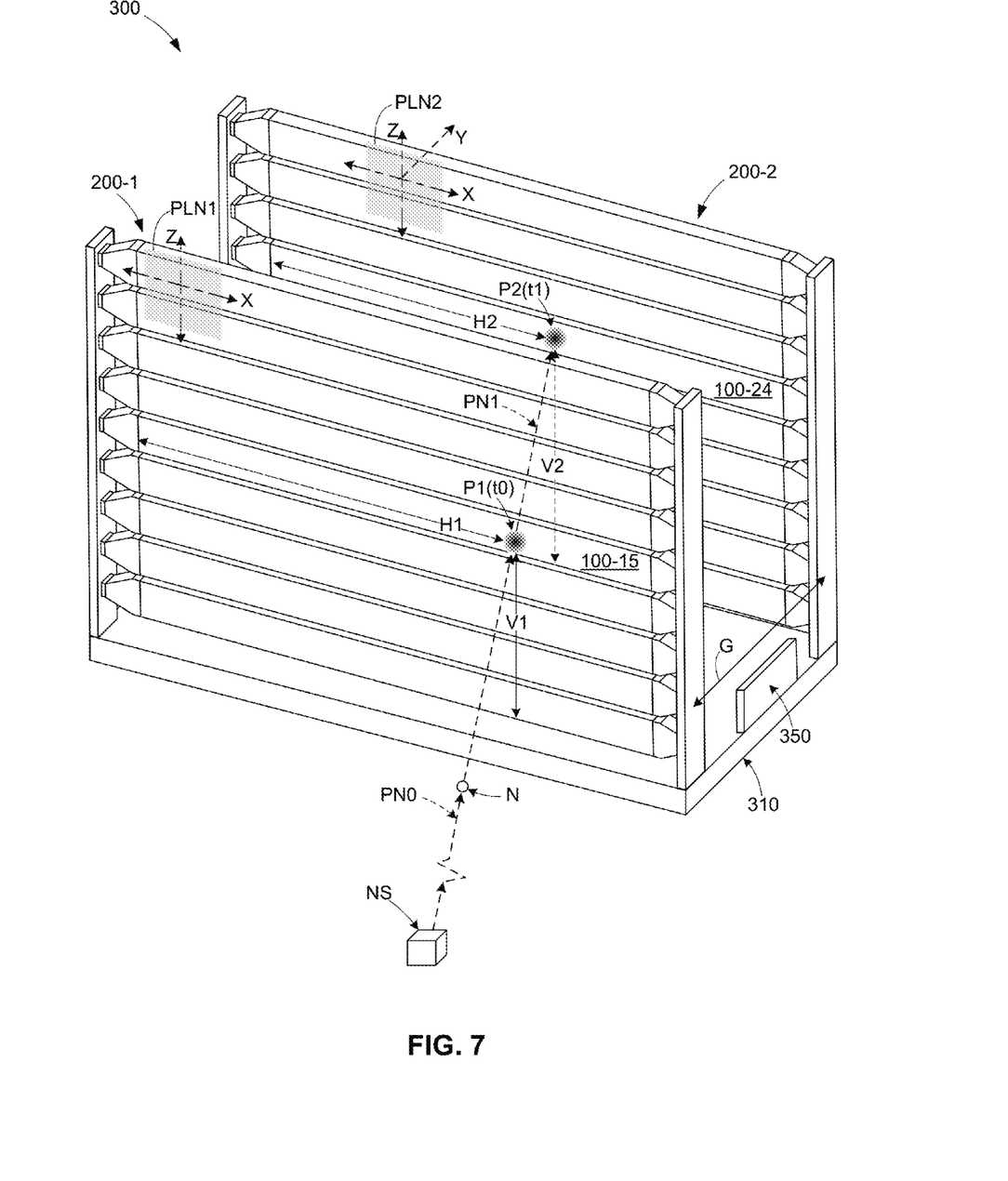
FIG. 7 is an top side perspective view showing the neutron detection system of FIG. 6 in an assembled state.

As indicated in FIG. 7, detector arrays 200-1 and 200-2 are mounted onto base structure 310 such that the detector cells of each array are horizontally aligned (i.e., parallel to an upper surface of base 310) and disposed in a spaced-apart manner separated by a gap distance G. Specifically, the detector cells of detector array 200-1 are disposed in a first X-Z plane PLN1, the detector cells of detector array 200-2 are disposed in a second X-Z plane PLN2, and planes PLN1 and PLN2 are separated by gap distance G.

Figure 9:
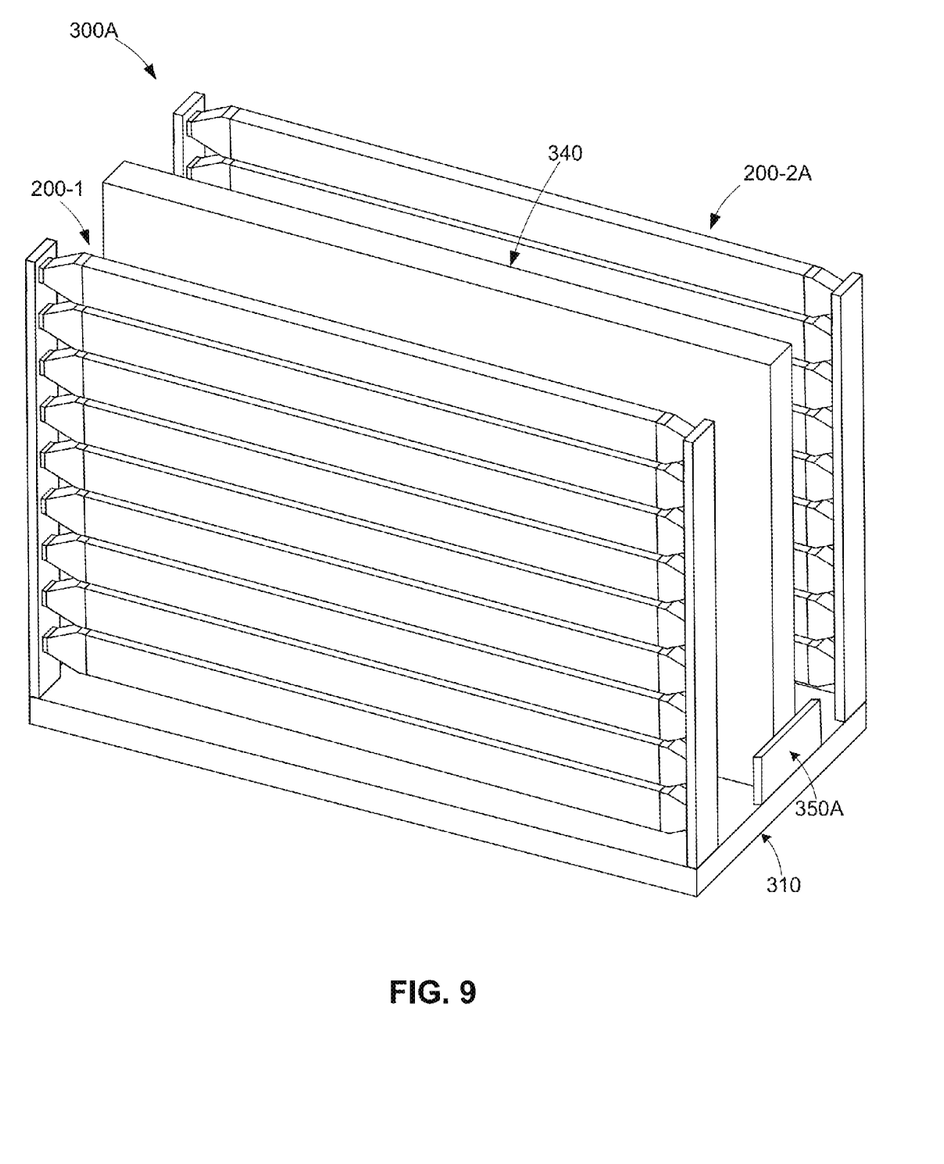
FIG. 9 is an top side perspective view a neutron detection system according to another embodiment of the present invention.

In one embodiment, first liquid scintillator 120-1 and second liquid scintillator 120-2 have the same composition. In other embodiments, first liquid scintillator 120-1 and second liquid scintillator 120-2 have different compositions selected to optimize neutron detection (see, e.g., the embodiment described below with reference to FIGS. 9 and 10). In either case, consistent with the embodiments describe above, both first liquid scintillator 120-1 and second liquid scintillator 120-2 include an ionic liquid blended with at least one of a scintillation enhancer, a moderator and a controlled optical attenuator.

Detection circuitry 350 is configured to determine a first incident location P1 corresponding to a first detection incident involving a neutron N passing through detector array 200-1, and a second incident location P2 corresponding to a second detection incident corresponding to the neutron N passing through said second detector array 200-2.

In one embodiment, detection circuitry 350 identifies incident neutron N by verifying that a measured time period between detection incident time t0 and detection incident time t1, which is determined by gap spacing G, is within a predetermined time range. Referring to FIG. 7, as incident neutron N passes through array 200-1 at a first time t0, it generates a first light pulse P1 at a first incident location (i.e., an X-Z location determined by longitudinal/horizontal value H1 and transverse/vertical value V1), then passes from array 200-1 to array 200-2 where it generates a second light pulse P2 at a second incident location (i.e., longitudinal value H2 and transverse value V2) at a subsequent time t1. In one embodiment, gap distance G separating arrays 200-1 and 200-2 is set in the range of 5 to 30 centimeters, which produces a measured time period in the range of 10 to 30 microseconds. Using this example, when detection signals received from arrays 200-1 and 200-2 differ in time by a value in the range of 10 to 30 microseconds (e.g., 20 microseconds), then those detection signals are processed in the manner described below to determine the location of neutron source NS. Conversely, when detection signals received from arrays 200-1 and 200-2 differ in time by less than 10 microseconds or more than 30 microseconds, those detection signals are ignored.

Neutron detection system 300 then determines the location neutron source NS by calculating the two interaction locations of light pulses P1 and P2, and then calculating an inter-array path traveled by incident neutron N (i.e., by aligning the two interaction locations of light pulses P1 and P2, which indicate where incident neutron N passed through arrays 200-1 and 200-2, respectively).

Figure 8A:
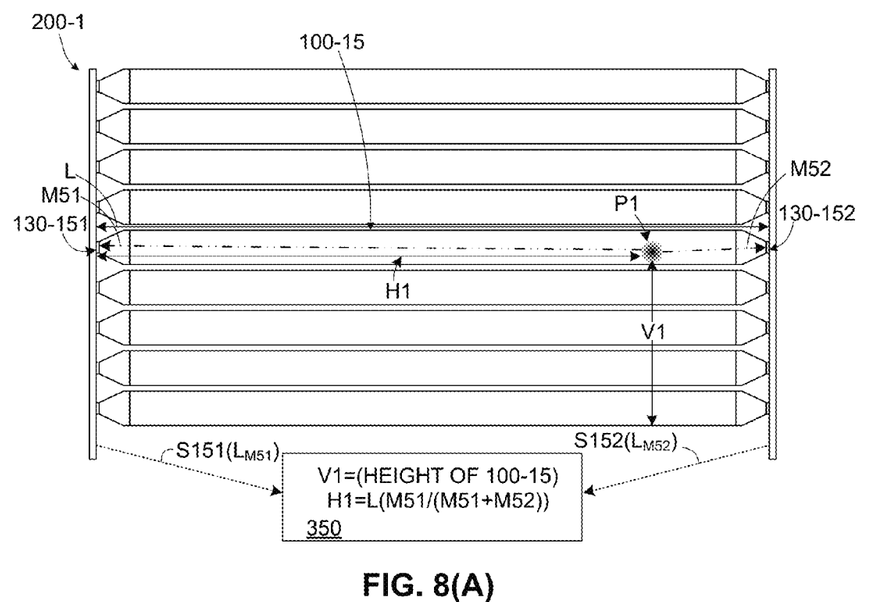
FIGS. 8(A) and 8(B) are simplified front views showing the neutron detector array of FIG. 7 during operation.

As indicated in FIG. 7, when incident neutron N is emitted from source NS and travels along an initial straight line path PN0 and enters array 200-1 at time t0. As indicated in FIG. 8(A), as the incident neutron passes through array 200-1, light pulse P1 occurs in cell 100-15, causing light portions having magnitudes M51 and M52 to be detected by photo-detectors 130-151 and 130-152, respectively, which in turn generate detection signals 5151 and 5152 respectively having light magnitude values $L_{M51}$ (indicating magnitude amount M51) and $L_{M52}$ (indicating magnitude amount M52). As indicated in the block at the bottom of FIG. 8(A), detection circuit 350 determines transverse location V1 of light pulse P1 by way of associating detection signals 5151 and 5152 with receiver cell 100-15, and determines longitudinal location H1 of light pulse P1 by way of comparing the magnitude values $L_{M51}$ and $L_{M52}$ (e.g., by multiplying cell length L by a proportion of magnitude M51 over the sum of magnitudes M51 and M52).

Figure 8B:
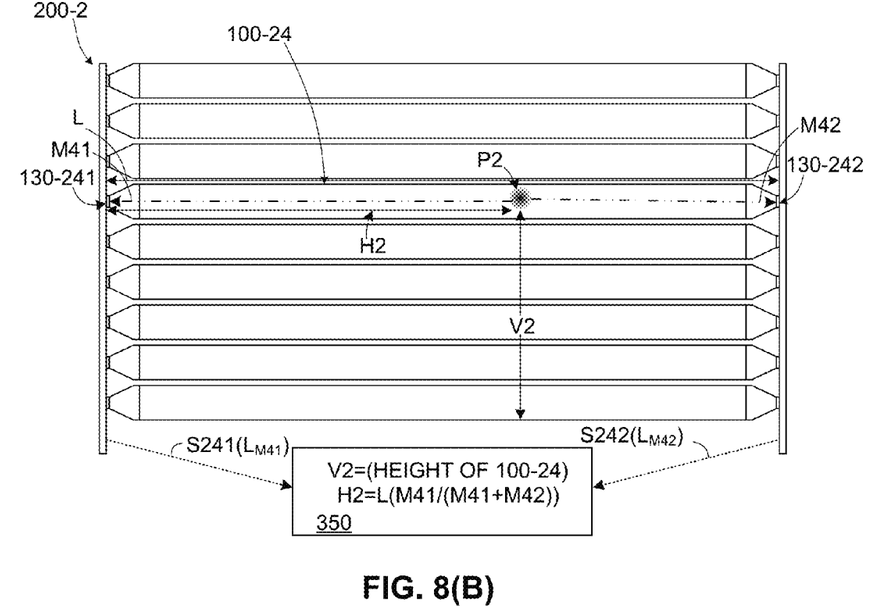

Referring again to FIG. 7, when incident neutron N exits array 200-1 it then travels along inter-array path PN1 from array 200-1 to array 200-2 and enters array 200-2 at time t1. As indicated in FIG. 8(B), as the incident neutron passes through array 200-2, light pulse P2 occurs in cell 100-42, causing light portions having magnitudes M41 and M42 to be detected by photo-detectors 130-241 and 130-242, respectively, which in turn generate detection signals 5241 and 5242 respectively having light magnitude values $L_{M41}$ (indicating magnitude amount M41) and $L_{M42}$ (indicating magnitude amount M42). As indicated in the block at the bottom of FIG. 8(B), detection circuit 350 determines transverse location V2 of light pulse P2 by way of associating detection signals 5241 and 5242 with receiver cell 100-24, and determines longitudinal location H2 of light pulse P2 by way of comparing the magnitude values $L_{M41}$ and $L_{M42}$.

Referring again to FIG. 7, once the incident locations of light pulses P1 and P2 are known, the location neutron source NS is generally determined by calculating inter-array path PN1 using the horizontal and transverse locations of light pulses P1 and P2, and then using inter-array path PN1 to determine initial path PN0, which indicates the path/direction PN traveled by the incident neutron N from source NS to the neutron detection system 300. Because path portions PN0 and PN1 are generally aligned (co-linear), system 300 facilitates finding neutron source NS by allowing an operator to "back-track" along the incident neutron's calculated straight-line path determined by calculated inter-array path PN1.

FIGS. 7 and 8 show a second neutron detection system 300A including two detector arrays 200-1 and 200-2A disposed in a spaced-apart arrangement on a base 310 in the manner set forth above with reference to system 300, and detection circuitry 350 coupled to detector arrays 200-1 and 200-2A in a manner similar to that described above and configured to determine the location of a neutron source by calculating an inter-array path taken by an incident neutron.

Figure 10:
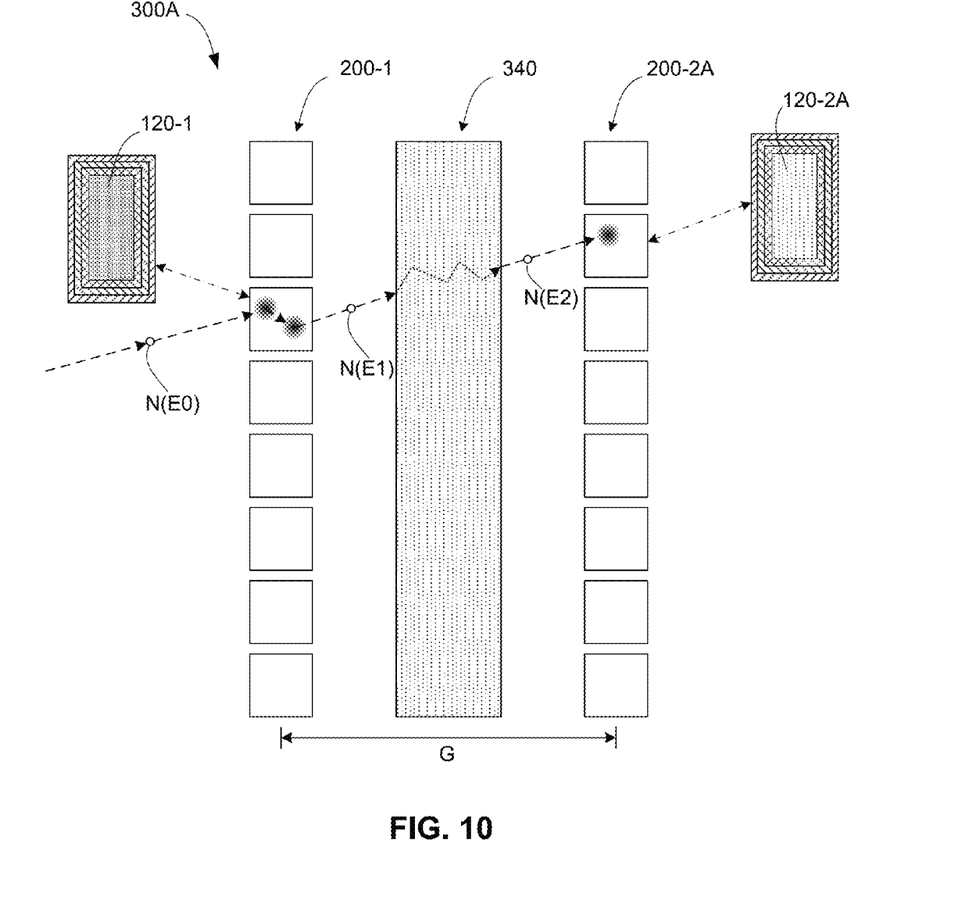
FIG. 10 is a simplified side view showing the neutron detector system of FIG. 9 during operation.

Neutron detection system 300A differs from neutron system 300 in that detection system 300A further includes a thermalizer layer 340 disposed between arrays 200-1 and 200-2A. Thermalizer layer 340 (e.g., a polyethylene block) serves to reduce the energy of an incident neutron N from an initial fast level (e.g., 0.5 ev to 2.5 eV) to a thermal level (e.g., on the order of 0.03 eV) before entering second array 200-2A. For example, as indicated in FIG. 10, an incident fast neutron N is shown entering array 200-1 with an initial energy E0 (e.g., 2.5 eV). Neutron N interacts with liquid scintillator 120-1 (i.e., causing proton knock-off followed by charged particle shower) and exits array 200-1 with somewhat reduced (but still fast) second energy E1 (e.g., 0.5 eV). Neutron N then passes through thermalizer layer 340, wherein upon leaving thermalizer layer 340 neutron N has a further reduced energy E2 having a thermal neutron energy level (e.g., 0.3 eV).

Neutron detection system 300A further differs from neutron system 300 in that a first liquid scintillator 120-1 disposed in the cells of array 200-1 includes a (first) composition that is sensitive to fast neutrons, and a (second) liquid scintillator 120-2A disposed in the cells of array 200-2A includes a different (second) composition that is sensitive to thermal neutrons. In one specific embodiment, liquid scintillator 120-1 disposed in all of the detector cells of array 200-1 comprises an ionic liquid (e.g., $[C_4C_1Pyr]^+$ and $[BF_4]^-$), 1% anthracene (scintillation enhancer), and 0.01% Alizarin (organic dye for controlled attenuation), and liquid scintillator 120-2A disposed in all of the cells of array 200-2A comprises ionic liquid (e.g., $[C_4C_1Pyr]^+$ and $[BF_4]^-$), 1% anthracene, 0.01% Alizarin, and a 20% mole fraction of Lithium tetrafluoroborate salt ($Li^+BF_4^-$). As such, liquid scintillator 120-2A differs from liquid scintillator 120-1 only in that it includes Lithium tetrafluoroborate salt, and in a specific embodiment the Lithium tetrafluoroborate salt consists essentially of $^6Li$ and $^{10}B$ isotopes. Lithium tetrafluoroborate salt is a known compound used in Lithium batteries, where the common commercial version of version of the salt comprises predominantly $^7Li$ and $^{11}B$ isotopes. The $^6Li$ and $^{10}B$ isotopes are particularly useful in neutron detection due to their extremely large cross-sections for thermal neutrons, and absorb the incident particle promptly within the Cell volume, which results in another scintillation signal. The general reactions are $^6Li(n,\alpha)^3H$, and $^{10}B(n,\alpha)^7Li$. By providing second liquid scintillator 120-2A with Lithium tetrafluoroborate, the thermal neutrons produced by thermalizer layer 340 are more readily captured.

Using the arrangement shown in FIG. 10, a suitable gap distance G between the two detector arrays 200-1 and 2A (e.g., in the range of 5 and 30 centimeters) facilitates identifying incident neutrons by comparing detections of fast neutrons in array 200-1 and thermal neutrons in array 200-2A that are separated by a measured time period in the range of 10 to 30 microseconds. Accordingly, detection circuitry 350A (FIG. 9) differs from detection circuitry 350 in that it is further configured to detect neutrons by measuring a time period separating first detection incidents in array 200-1 involving fast neutrons and second detection incidents in array 200-2A involving thermal neutrons, and verifying that the measured time period is in the range of 10 to 30 microseconds.

Figure 11:
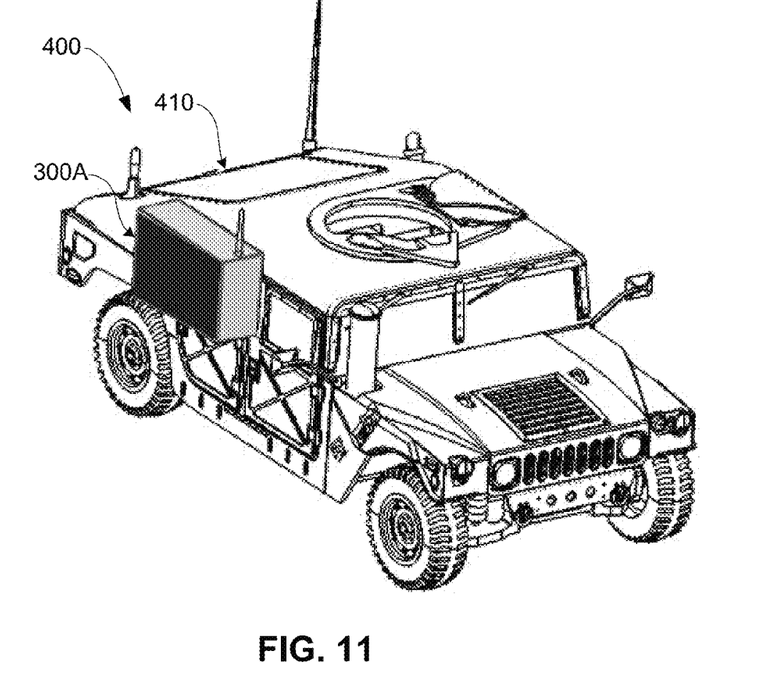
FIG. 11 is a perspective view showing the neutron detector system of FIG. 8 disposed on a tactical vehicle.

FIG. 11 is a perspective view showing a mobile neutron detection system 400 including a tactical vehicle 410 having neutron detector system 300A (discussed above with reference to FIGS. 9 and 10) fixedly mounted thereon. By facilitating the determination of the transverse (cross-wise) and longitudinal location of each incident neutron, neutron detector systems of the present invention provide a lightweight (and therefore mobile) system for determining the path taken by incident neutrons, which in turn facilitates locating the neutron source (e.g., the location of abandoned, lost or stolen nuclear materials from which the neutron was emitted).

Although the present invention has been described with respect to certain specific embodiments, it will be clear to those skilled in the art that the inventive features of the present invention are applicable to other embodiments as well, all of which are intended to fall within the scope of the present invention. For example, although cells are arranged in planar parallel arrays in the disclosed embodiments, other arrangements may be utilized, such as offset staggered arrangements.

The invention claimed is:

1. A neutron detector cell comprising:
    an elongated detector tube having a first end and an opposing second end and including a peripheral wall defining an enclosed channel,
    a liquid scintillator disposed in the elongated channel, said liquid scintillator including an ionic liquid blended with a controlled optical attenuator and at least one of a scintillation enhancer and a moderator such that the liquid scintillator is configured to generate a light pulse at an interaction point in response to an incident neutron, and configured such that light transmitted along the elongated detector tube from said light pulse is attenuated by an amount that is inversely proportional to a distance traveled from the interaction point along the elongated detector tube;
a first photo-detector optically coupled to the first end of said elongated detector tube, said first photo-detector configured to detect a first portion of said light pulse that is transmitted from said interaction point through said liquid scintillator to the first end, and to generate a first detection signal including a first light magnitude value indicating a first light amount of said first portion; and
a second photo-detector optically coupled to the second end of said elongated detector tube, said second photo-detector configured to detect a second portion of said light pulse transmitted from said interaction point through said liquid scintillator to the second end, and to generate a second detection signal including a second light magnitude value indicating a second light amount of said second portion, whereby a longitudinal location of said light pulse along said elongated detector tube is determinable by a difference between said first and second light magnitude values.

2. The neutron detector cell of claim 1, wherein the ionic liquid of the liquid scintillator comprises one or more anions derived from the group including derived from the group including $[BF_4]^-$, $[PF_6]^-$, $[CF_3SO_2NSO_2CF_3]^-$, $[CF_3SO_3]^-$, and $[N(CN)_2]^-$, and one or more cations derived from the group including imidazolium, pyridinium, pyrimidinum, pyrazinium, pyrazolium, piperdinium and pyrrolidinium.

3. The neutron detector cell of claim 2, wherein the liquid scintillator comprises said ionic liquid blended with at least one of Athracene, an organic scintillator and inorganic scintillator.

4. The neutron detector cell of claim 2, wherein the liquid scintillator comprises said ionic liquid blended with at least one of Lithium and Boron.

5. The neutron detector cell of claim 2, wherein the liquid scintillator comprises said ionic liquid blended with at least one organic dye.

6. The neutron detector of claim 1, wherein the ionic liquid comprises a Room Temperature Ionic Liquid (RTIL).

7. The neutron detector cell of claim 6, wherein the liquid scintillator consists essentially of said RTIL blended with Anthracene.

8. The neutron detector cell of claim 6, wherein the liquid scintillator consists essentially of said RTIL blended with Lithium isotopes $^6$Li, Boron isotopes $^{10}$B and an organic dye.

9. The neutron detector cell of claim 6, wherein the liquid scintillator consists essentially of said RTIL blended with Lithium isotopes $^6$Li, Boron isotopes $^{10}$B, an organic dye and Anthracene.

10. The neutron detector cell of claim 1, further comprising a tapered light guide disposed between the first end of said detector tube and said first photo-detector.

11. The neutron detector cell of claim 1,
wherein the peripheral wall of the detector tube comprises one of plastic and glass, and
wherein the neutron detector cell further comprises:
a reflective layer comprising a reflective material disposed on an outside surface of the peripheral wall; and
a light-sealing layer comprising a material that is opaque to black light disposed on an outside surface of the reflective layer.

12. A neutron detector cell comprising:
an elongated detector tube having a first end and an opposing second end and including a peripheral wall defining an enclosed channel,
a liquid scintillator disposed in the elongated channel, said liquid scintillator including an ionic liquid blended with at least one of a scintillation enhancer, a moderator and a controlled optical attenuator;
a first photo-detector optically coupled to the first end of said detector tube, said first photo-detector configured to detect a light pulse generated by said liquid scintillator, and to generate a first detection signal including a first light magnitude value indicating a first portion of said light pulse arriving at said first end of said detector tube; and
a second photo-detector optically coupled to the second end of said detector tube, said second photo-detector configured to detect said light pulse and to generate a second detection signal including a second light magnitude value indicating a second portion of said light pulse arriving at said second end of said detector tube,
wherein the ionic liquid of the liquid scintillator comprises one or more anions derived from the group including derived from the group including $[BF_4]^-$, $[PF_6]^-$, $[CF_3SO_2NSO_2CF_3]^-$, $[CF_3SO_3]^-$, and $[N(CN)_2]^-$, and one or more cations derived from the group including imidazolium, pyridinium, pyrimidinum, pyrazinium, pyrazolium, piperdinium and pyrrolidinium blended with at least one organic dye, and
wherein the organic dye comprises an anthraquinone-based organic dye.

13. A neutron detector cell comprising:
an elongated detector tube having a first end and an opposing second end and including a peripheral wall defining an enclosed channel,
a liquid scintillator disposed in the elongated channel, said liquid scintillator including an ionic liquid blended with at least one of a scintillation enhancer, a moderator and a controlled optical attenuator;
a first photo-detector optically coupled to the first end of said detector tube, said first photo-detector configured to detect a light pulse generated by said liquid scintillator, and to generate a first detection signal including a first light magnitude value indicating a first portion of said light pulse arriving at said first end of said detector tube; and
a second photo-detector optically coupled to the second end of said detector tube, said second photo-detector configured to detect said light pulse and to generate a second detection signal including a second light magnitude value indicating a second portion of said light pulse arriving at said second end of said detector tube,
wherein the ionic liquid comprises a Room Temperature Ionic Liquid (RTIL), and
wherein the liquid scintillator consists essentially of said RTIL blended with Lithium isotopes $^6$Li and Boron isotopes $^{10}$B.

* * * * *